April 9, 1940.  L. E. SENG  2,196,839
DUST COLLECTOR AND AIR FILTER
Filed Aug. 19, 1938  3 Sheets-Sheet 1
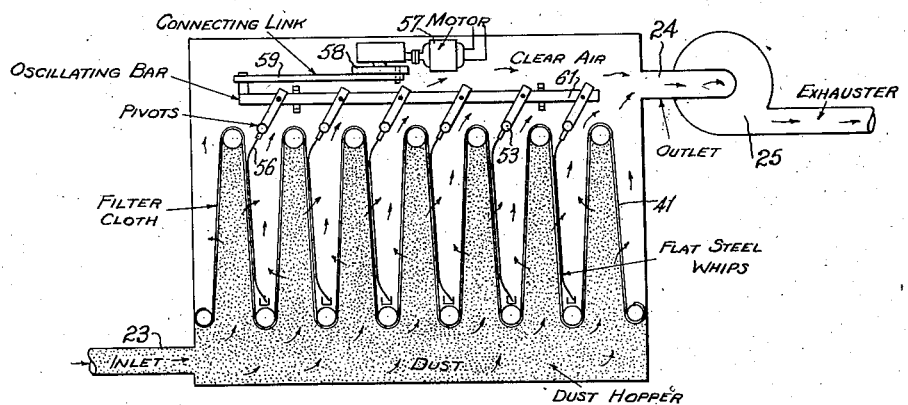
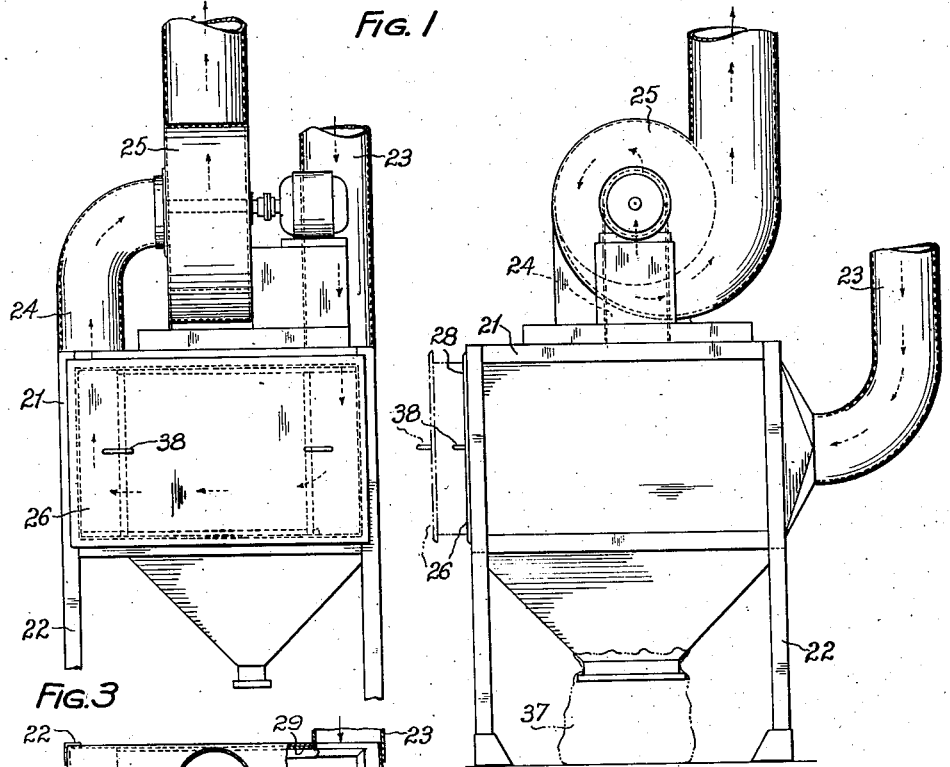
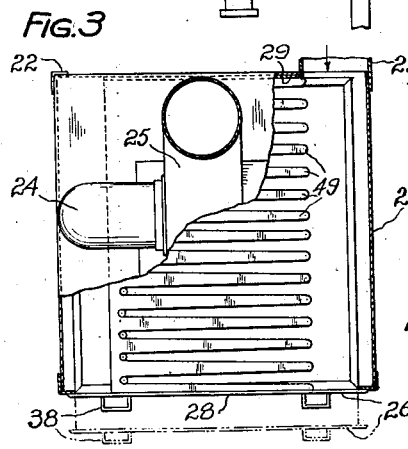
INVENTOR.
LEROY E. SENG
BY Morton S. Brockman
ATTORNEY.

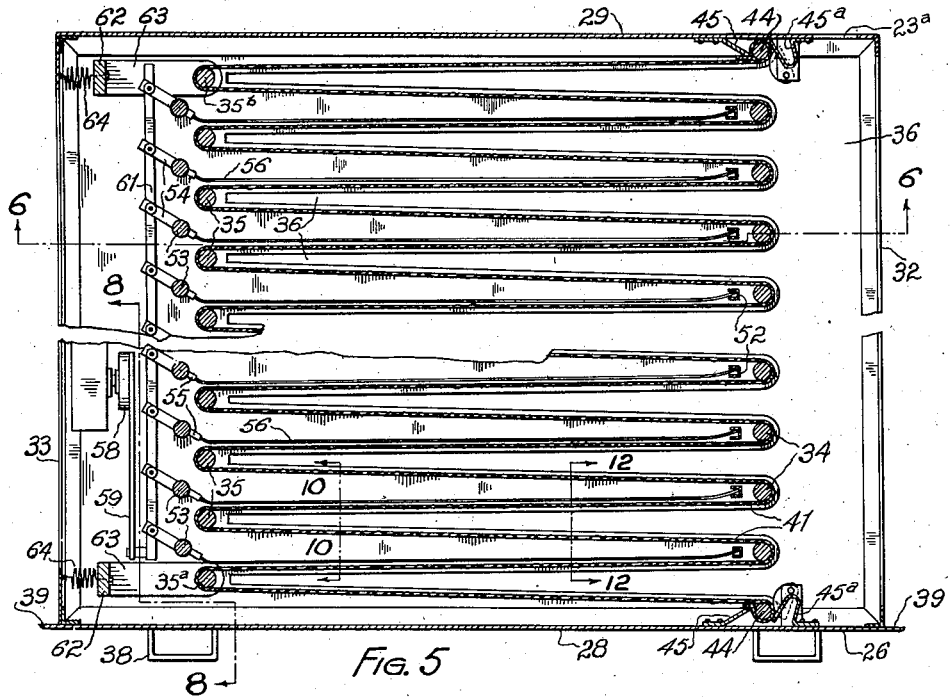
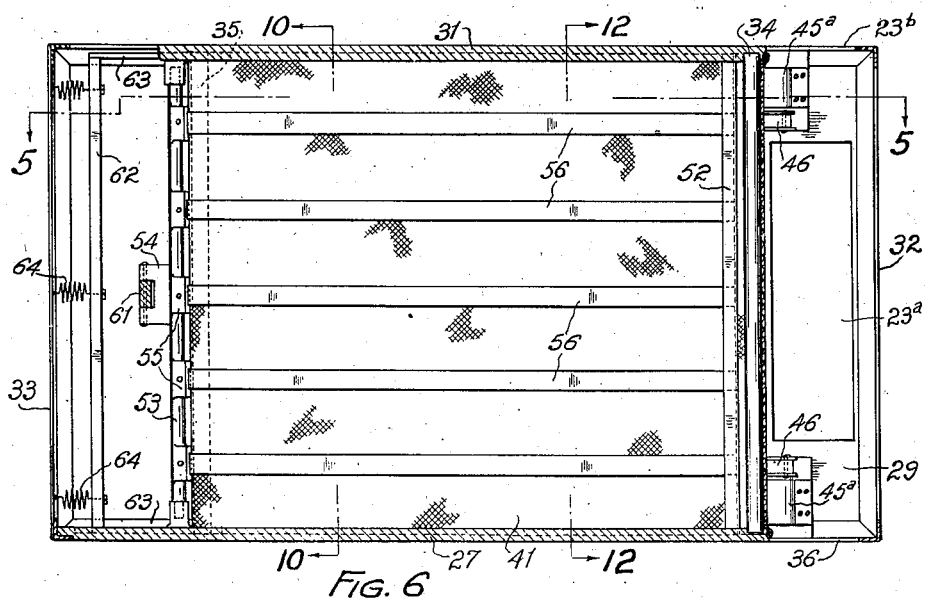
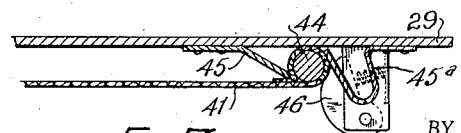

April 9, 1940.   L. E. SENG   2,196,839
DUST COLLECTOR AND AIR FILTER
Filed Aug. 19, 1938   3 Sheets-Sheet 3

INVENTOR.
LEROY E. SENG
BY Morton L. Brockman
ATTORNEY.

Patented Apr. 9, 1940

2,196,839

UNITED STATES PATENT OFFICE 2,196,839

DUST COLLECTOR AND AIR FILTER

Leroy E. Seng, South Euclid, Ohio

Application August 19, 1938, Serial No. 225,757

9 Claims. (Cl. 183—59)

This invention relates to devices used for removing dust or other suspended particles from the air and particularly to filters used in factories, foundries or mills to remove injurious dust particles from the air in the room.

The principle object of the invention is to provide a device that is simple to construct and inexpensive to operate and maintain.

Another object is to provide a device of the type mentioned with an inexpensive filter medium which is simply, easily and quickly replaced or cleaned.

A further object is to equip a filter of the type mentioned with beaters or agitators that are quiet in operation and which minimizes strain, stress and wear of the device and particularly of the filter medium.

Still another object is to construct a dust remover and blower combination with a removable filtering unit and accompanying agitating mechanism.

A still further object is to provide a dust remover with a filter cloth support that is stamped or formed out of inexpensive sheet metal.

These and other objects and features of the invention will become apparent from a study of the following description and claims together with the accompanying drawings in which like parts are designated by like reference characters and wherein:

Figure 1 is a diagrammatic view of the apparatus embodying the invention;

Figure 2 is a side view of the air filter and dust collector;

Figure 3 is a front view of the apparatus;

Figure 4 is a top view of the same with certain parts broken away to show the interior structure;

Figure 5 is an enlarged top view of the interior section or removable filter unit, the view taken along the lines 5—5 of Figure 6;

Figure 6 is a vertical sectional view of the same unit taken along the lines 6—6 of the Figure 5;

Figure 7 is an enlarged view of the filter cloth and retaining means;

Figure 8:
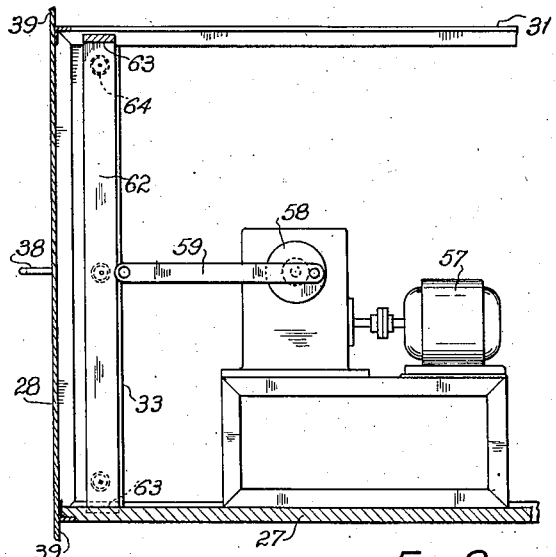
Figure 8 is a vertical sectional view of the same unit taken along the lines 8—8 of the Figure 5.
Figure 9:
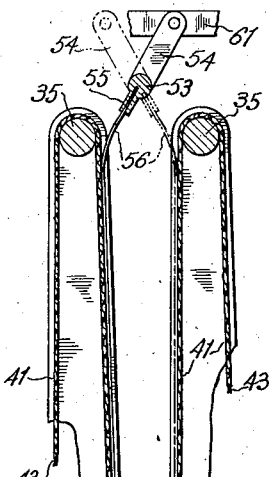
Figure 9 is an enlarged plan view and section of one of the beater elements shown in the Figure 5.

The instant invention consists of a metal box-like cabinet 21 mounted on a frame-work 22. The cabinet 21 has an air intake 23 and a clean air outlet 24. The circulation of air is maintained by the motor driven blower or fan 25.

The separate features of this invention are all centered around the removable filtering unit contained in the cabinet 21, hereinafter described in detail.

The filter unit consists of a smaller box-like cabinet or covered sheet metal drawer 26 which snugly fits the aforementioned cabinet 21 and which is made up of a base member 27, front panel 28, a rear panel 29, a right side panel 32, a left side panel 33 and a top panel or cover 31.

The base 27 of the drawer 26 is substantially rectangular and has an irregular shaped opening 36 on its right side for allowing the dust particles to follow through and into the dust trap 37. This irregular shaped opening 36 will be more fully described hereinafter.

The front panel 28 is provided with grips or handles 38 for facilitating its removal or handling. It has a flange 39 which extends around its four edges to help it make an air tight fit in the cabinet 21 and also has a filter cloth retaining means mounted on its inside surface, which means will also be described in detail later.

The rear panel 29 is similarly provided with a filter cloth retaining means and in addition has an opening 23a which matches the dusty air intake 23 of the cabinet 21.

The right side panel 32 and the left side panel 33 are simply sheets of metal which complete the vertical frame-work of the drawer 26. The top panel or cover 31 is provided with a clean air outlet 24a which is contiguous to or corresponds with the outlet 24 of the cabinet 21. Each of the side, rear and top panels are provided with suitable doors or openings through which the interior parts may be reached for repair, adjustment or replacement.

Mounted vertically between the base 27 and the top panel 31 are two parallel rows of supports or rollers 34 and 35. In the drawings the rollers 34 are shown mounted on the right side of the drawer and the row of rollers 35 are mounted near the left panel 33. The rollers 34 and 35 are staggered or mounted somewhat obliquely as clearly shown in the Figures 5 and 8 rather than exactly opposite each other, there being an odd number of rollers 35 and an even number of rollers 34 which simplifies the mounting of them in the oblique manner.

Figures 10, 12, 13, 14:
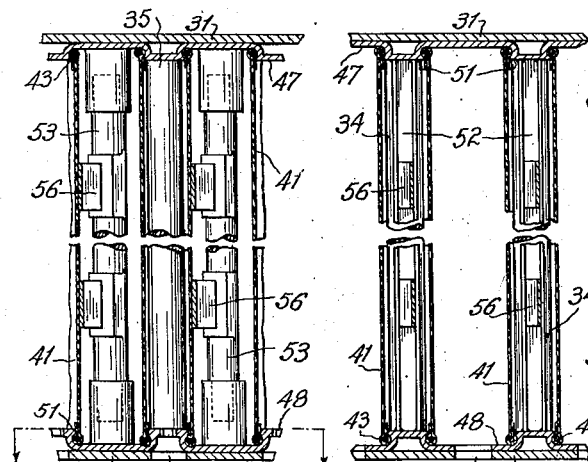
Figure 10 is a vertical sectional view of the left side filter and beater supports, the view taken along the lines 10—10 of the Figures 5 and 6.
Figure 12 is a vertical sectional view of the right side filter and beater supports, the view taken along the lines 12—12 of the Figures 5 and 6.
Figure 13 is an enlarged sectional view of a part of the filter support.
Figure 14 is a side view of a section of filter cloth showing the draw-cords in the hemmed edges thereof.
Figure 11:
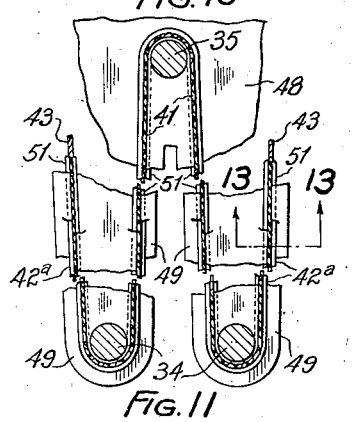
Figure 11 is an enlarged plan view showing in greater detail the filter cloth and its corded edge retaining means.
Figure 15:
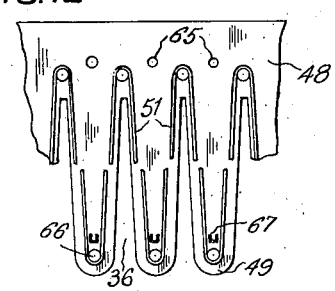
Figure 15 is a plan view of a part of one of the filter cloth holders or dentiform plates.

A sheet or strip of filter cloth 41 is wrapped shuttlewise around the rollers 34 and 35 thereby dividing the drawer member 26 into two irregular cuneal compartments. The filter cloth 41 may be made of any suitable textile material of which there are numerous standard makes now on the market. Its (41) two longitudinal or top and bottom edges 42 and 42a are hemmed and contain the draw-cords 43 as is shown in the Figures 13 and 14.

The vertical ends of the filter cloth 41 are wound around the rods 44 and are held up against the inside walls of the front and rear panels 28 and 29 by the spring clips or clamps 45 and 45a. To prevent the rods 44 and the material thereon from turning in the said clamps and thereby loosening the filter cloth, a small eccentric or cam-like member is pivoted near the clamps and the rod so that when the cloth is drawn outward of the said clamps the eccentric 46 will tighten and prevent the cloth from being pulled through. This feature is more clearly illustrated in the Figures 5 and 7 of the drawings.

In order to prevent the unclean air from passing over or under the filter cloth 41 from the intake compartment to the outlet compartment, a special filter cloth holder is designed. This consists of two sheet metal dentiform stampings or serrated beaded plates 47 and 48. The plate 47 is attached to the cover 31 and the plate 48 is attached to the base 27. The teeth 49 of the comb-like stampings 47 and 48 extend from left to right and are fastened so as to be complementary, one over the other. The teeth 49 are stamped with a small ridge or bead 51 in which is retained the corded filter cloth edges 42 and 42a. This bead 51 is made so that it extends uniformly to and from and around the rollers 34 and 35 and the end rods 44. They are also provided with suitable holes or openings 65 for the support or retention of the pivot rods 53; suitable holes or openings 66 for the support or retention of the rollers 34 and 35 and suitable U-shaped slots 67 for the support or retention of the channel bars 52. By tightening the draw-cords 43 the filter cloth 41 is snugly held between the compartments with the rollers 34 in the clean air compartment and the rollers 35 in the unclean air compartment.

The dust laden air strikes the comb-like folds of the filter cloth 41 on the right and in order to provide for the elimination of the accumulated dust that is removed from the air by the cloth 41 the irregular opening 36 is cut in the base 27 which leads to the dust trap 37. This opening follows the outline of the holder 49 and extends back to the rear of the drawer 21.

The beater or snap-whip mechanism which agitates the filter cloth 41 so as to remove the particles of dust settling therein, is located in the left or clean air side of the filter unit. This mechanism consists of a series of U-shaped metal strips or channel bars 52 mounted vertically to the left of the rollers 34 and just between the folds of the plicated filter cloth 41. Slightly to the left of and between the filter cloth covered rollers 35 there is mounted a vertical row of rocker-bars or pivot rods 53; to each of which there are attached rocker arms 54 and a series of cradle rods or fingers 55. A plurality of beaters or whips 56 are attached to the cradle fingers 55 and extend horizontally and parallel into the aforementioned channel bars 52. The whips 56 are made of spring steel and are slightly longer than the distance between the cradle-rods 55 and the channel bars 52, which extra length causes them to bow between the folds of the filter cloth 41 sufficiently to contact the adjacent cloth for the greater part of its length.

A simple trippet mechanism is mounted in the drawer 26 to operate the rocker arms 54 and through them the cradle fingers 55 and the whips 56. This mechanism consists of an electric motor 57 which rotates the cam-wheel 58, which in turn actuates the connecting links 59 and the oscillating bar or rocker arm connector 61. The rotation of the cam 48 causes the rockers 52 and cradle fingers 55 to oscillate back and forth thereby imparting a snappy whipping motion to the beaters 56. The beaters 56 because of their extra length are caused to vibrate between the folds of the filter cloth 41 thereby agitating or whipping the cloth sufficiently to loosen it of its accumulated dirt.

In order to automatically compensate for the stretch of the filter cloth caused by the constant beating and agitating and to keep it taut at all times, the first and last rollers 35 and 35b in the left hand row of rollers are provided with a tensioning spring. The rollers 35a and 35b are slidably mounted in grooves rather than in a fixed position and the draw bars 62 and draw links 63 are connected to the left side panel 23 with the springs 64. The draw bars 62 are mounted vertically as shown in the Figures 6 and 8 and the draw links 63 engage the bottom and top ends of the rollers 35a and 35b.

As conducive to a clearer understanding of the device and its advantages over the prior art it may be well to point out that with this invention the entire filter unit may be removed including all the filtering elements and moving parts. Heretofore if the filter elements broke down or needed repairs the shop was also shut down. With this device a new filtering unit may be substituted in a few minutes for the one needing repairs without complicated dismemberment or dismantling of the entire cabinet. Also it will be noted that in the beater mechanism the moving parts can be made to work with the utmost silence because the agitators or whips strike against the cloth only and not against any solid or metallic parts.

It will now be clear that there is provided by this invention a dust collector and an air filter which accomplishes the objects of the invention. While the invention has been described in its preferred form and while certain general terms and specific language have been used, it is to be understood that the embodiment of the invention as described is illustrative only and is not to be considered in a limiting sense. It is to be further understood that there are other forms of the invention which will suggest themselves to persons making, using or selling similar devices and those modifications as well as the modifications of the illustrated form are all considered to be within the broad scope of the invention as no limitations upon it are intended other than those imposed thereon by the scope of the appended claims.

I claim:

1. A filter unit, comprising in combination, a cabinet member, a fabricated air filtering material dividing the cabinet into two chambers, a plurality of longitudinal whip members mounted in one of the said chambers adjacent to the filtering material, and a means for reciprocating the whips in a manner whereby the central portions thereof are caused to bow with a snap-action and thereby agitate the said filtering material.

2. A filter unit, comprising in combination, a cabinet having inlet and outlet apertures, a fabricated air filtering material dividing the cabinet into two chambers, each of the said chambers having one of the apertures, a plurality of longitudinal whip members mounted in the chamber having the outlet aperture, and a trippet mechanism mounted in the chamber having the outlet aperture and actuating the whip members in a manner whereby the central portions thereof are caused to bow with a snap-action and thereby agitate the said filtering material.

3. A filter unit, comprising in combination, a cabinet member, a fabricated air filtering material dividing the cabinet into two chambers, a plurality of longitudinal whip members mounted at each of their ends in one of the said chambers and adjacent to the filtering material, and a reciprocator actuating the said whip members in a manner whereby the portions thereof intermediate the said ends are caused to flex with a snap-action and thereby agitate the said filtering material.

4. A filter unit, comprising in combination, a cabinet member, a rectangular filter cloth mounted in the cabinet member and dividing the said cabinet member into two chambers, a plurality of parallel longitudinal whip members mounted adjacent to the filter cloth, the said whip members having substantially stationary ends and bowed portions between the said ends, and a trippet mechanism snapping the whip members in a manner whereby the bowed portions thereof beat the filter cloth.

5. A filter unit, comprising in combination, a cabinet member, a sheet of filter material dividing the cabinet into two compartments, a plurality of supports mounted in the cabinet and supporting the said filter material, the said supports being staggered for supporting the said filter material in a manner forming a plurality of interlocking cuneal pockets, a plurality of longitudinal whip members having bowed portions mounted in the cuneal pockets of one of the compartments, and an agitating means bowing the whip members alternately from side to side in a manner causing the said bowed portions to beat the filter material on each side of the said pockets.

6. A filter unit, comprising in combination, a cabinet having inlet and outlet apertures, a sheet of filter cloth dividing the cabinet into two compartments, each of the said compartments having one of the apertures, a plurality of rollers mounted in the cabinet supporting the said filter cloth, the said rollers being staggered for supporting the filter cloth in a manner forming a plurality of interlocking cuneal pockets, a plurality of longitudinal whips, a plurality of supports mounted in the pockets of the compartment having the outlet aperture, the said supports bowing the said whips and causing the bowed portions thereof to contact the adjacent filter cloth, and a reciprocator actuating the said whips alternately from side to side in a manner causing the bowed portions thereof to agitate the said filter material.

7. In a filter unit having a filter cloth, an agitator, comprising in combination, a supporting base, a rocker bar pivoted on the supporting base, a channel bar mounted on the supporting base parallel to the rocker bar, beater members attached to the rocker bar and engaged by the said channel bar, the said beater members having bowed portions intermediate the said bars, and a reciprocating mechanism mounted on the supporting base pivoting the rocker bar in a manner causing the beater members to whip from side to side striking the said filter cloth.

8. In a filter unit having a filter cloth therein, snap-whip beaters, comprising in combination, a horizontal platform, a plurality of rocker-arms mounted on the platform, a plurality of vertical cradle-rods attached to the said rocker-arms, a plurality of vertical channel-bars facing the said cradle-rods and attached to the said platform, a plurality of horizontal beaters attached to the cradle-rods and flexed by the said channel-bars, and a trippet for reciprocally operating the said rocker-arms whereby the said beaters are bowed from side to side striking the said filter cloth.

9. In a filter unit of the type having a cabinet divided by a plicated filter cloth into inlet and outlet compartments having interlocking cuneal pockets, an agitator, comprising in combination, a plurality of longitudinal whips mounted in the cuneal pockets of the outlet compartment, a means for flexing the said whips forming bowed portions thereon, and a rocker member actuating the said whips in a manner causing the said bowed portions to contact the said filter cloth.

LEROY E. SENG.